United States Patent
Bonifas et al.

(10) Patent No.: US 12,264,717 B2
(45) Date of Patent: Apr. 1, 2025

(54) REDUCED DRAG STATOR CLIP

(71) Applicant: GOODRICH CORPORATION, Charlotte, NC (US)

(72) Inventors: Alan M. Bonifas, Vandalia, OH (US); Matthew Ryan O'Neil, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 388 days.

(21) Appl. No.: 17/752,686

(22) Filed: May 24, 2022

(65) Prior Publication Data
US 2023/0383800 A1  Nov. 30, 2023

(51) Int. Cl.
*F16D 65/12* (2006.01)
*B64C 25/44* (2006.01)
*F16D 65/02* (2006.01)

(52) U.S. Cl.
CPC .............. *F16D 65/123* (2013.01); *B64C 25/44* (2013.01); *F16D 2065/1344* (2013.01); *F16D 2065/136* (2013.01); *F16D 2065/1392* (2013.01)

(58) Field of Classification Search
None
See application file for complete search history.

(56) References Cited

U.S. PATENT DOCUMENTS

| | | | |
|---|---|---|---|
| 3,605,967 A | 9/1971 | Warren et al. | |
| 3,927,740 A * | 12/1975 | Zarembka | F16D 65/126 188/218 XL |
| 4,007,814 A * | 2/1977 | Berger | F16D 65/121 188/218 XL |
| 4,585,096 A | 4/1986 | Bok | |
| 4,784,246 A * | 11/1988 | Edmisten | F16D 65/126 188/218 XL |
| 10,436,265 B2 | 10/2019 | Stevenson | |
| 2013/0153344 A1 * | 6/2013 | Morio | F16D 65/123 188/218 XL |
| 2021/0332865 A1 | 10/2021 | Lindner et al. | |

FOREIGN PATENT DOCUMENTS

WO    WO8000735 A1 *    4/1980

OTHER PUBLICATIONS

European Patent Office, European Search Report dated Oct. 2, 2023 in Application No. 23174950.8.

* cited by examiner

*Primary Examiner* — Melanie Torres Williams
(74) *Attorney, Agent, or Firm* — SNELL & WILMER L.L.P.

(57) ABSTRACT

Stator clips may be disposed in the recesses of aircraft brake stator disks to increase the lug strength of the stator disk. The clips may interface with the splines of a torque plate and may comprise ridges that reduce contact between the torque plate barrel and the clip, while maintaining the overall integrity of the clip structure. Furthermore, reduced contact may enable a reduction in drag, improving brake performance.

18 Claims, 7 Drawing Sheets

REDUCED DRAG STATOR CLIP

FIELD

The present disclosure relates to brake assemblies (e.g., aircraft) and, more specifically, to stator clips mounted on lugs of a stator disk for a brake assembly.

BACKGROUND

Wrap around or U-channel stator clips are used to increase the structural capability of the stator disk(s) of a brake assembly, such as an aircraft brake assembly, or to reduce stator slot enlargement in-service. In some cases, the increased strength is beneficial for loadings associated with in-service conditions. The use of stator clips may result in reduced braking performance at high aircraft landing energies. It is believed to be a result of stator clip drag on the torque plate spline.

SUMMARY

A stator clip is disclosed herein, in accordance with various embodiments. The stator clip may comprise a spline interface, in accordance with various embodiments. The spline interface may comprise a first face, a second face, and a third face. The first face may be opposite the second face. In various embodiments, the first face and the second face may each comprise a ridge. In various embodiments, the third face may bridge between the first face and the second face. The third face may be orthogonal to the first face and the second face.

In various embodiments, the stator clip may comprise a first flange pair and second flange pair. The first flange pair may be orthogonal to a reverse side wall of the first face. In various embodiments, the first flange pair may comprise opposing flanges. In various embodiments, each flange may define a lug recess. In various embodiments, the second flange pair may be orthogonal to a reverse side wall of the second face. The second flange pair may comprise opposing flanges. In various embodiments, each flange may define a lug recess.

In various embodiments, the spline interface of the stator clip may be U-shaped. In various embodiments, the spline interface of the stator clip may be monolithic. In various embodiments, the stator clip may be configured to be riveted to a stator disk. In various embodiments, the first face and the second face may each comprise at least two ridges. The at least two ridges may be hemi-cylindrical. In various embodiments, the at least two ridges may each comprise rounded ends.

A brake assembly is also disclosed herein, in accordance with various embodiments. The brake assembly may comprise a torque plate barrel. The torque plate barrel may comprise an outer surface disposed around a first reference axis. In various embodiments, the outer surface may comprise a first spline proceeding about the first reference axis. In various embodiments, the brake assembly may comprise a stator disk assembly mounted on the torque plate barrel.

The stator disk assembly may comprise a stator disk comprising an inner perimeter disposed about a first aperture. In various embodiments, the inner perimeter may comprise a first recess. The inner perimeter may comprise a first lug and second lug proximate the first recess. The first lug and second lug may be disposed on either side of the first recess. In various embodiments, the torque plate barrel may extend into the first aperture of the stator disk. In various embodiments, the stator disk assembly may comprise a first stator clip disposed within the first recess. In various embodiments, the first spline may be disposed within a spline interface of the first stator clip.

In various embodiments, the torque plate barrel may further comprise a second spline. The second spline and the first spline may be spaced from one another proceeding about the first reference axis. In various embodiments, the inner perimeter may further comprise a second recess. The inner perimeter may comprise a third lug and fourth lug proximate the second recess. The third lug and fourth lug may be disposed on either side of the second recess.

In various embodiments, the brake assembly may comprise a second stator clip disposed within the second recess. In various embodiments, the second spline may be disposed within a spline interface of the second stator clip. In various embodiments, the first stator clip may be riveted to the first lug and the second lug of the inner perimeter. In various embodiments, the second stator clip may be riveted to the third lug and fourth lug of the inner perimeter.

A stator disk assembly is also disclosed herein, in accordance with various embodiments. In various embodiments, the stator disk assembly may comprise a stator disk comprising an inner perimeter disposed about a first aperture. The inner perimeter may comprise a first recess. In various embodiments, the inner perimeter may comprise a first lug and second lug proximate the first recess. The first lug and second lug may be disposed on either side of the first recess. In various embodiments, the stator disk assembly may comprise a first stator clip disposed within the first recess.

In various embodiments, the first stator clip may comprise a spline interface. The first stator clip may further comprise a first flange pair. The first stator clip may further comprise a second flange pair. In various embodiments, the spline interface of the stator disk assembly may comprise a first face, a second face, and a third face. The first face may be opposite the second face. The first face and second face may each comprise a ridge. In various embodiments, the third face may bridge between the first face and the second face. The third face may be orthogonal to the first face and the second face.

In various embodiments, the first flange pair may be orthogonal to the first face and the second face. In various embodiments, the first flange pair may be orthogonal to a reverse side wall of the first face. The first flange pair may comprise opposing flanges, each flange defining a lug recess. In various embodiments, the second flange pair may be orthogonal to a reverse side wall of the second face. The second flange pair may comprise opposing flanges, each flange defining a lug recess.

In various embodiments, the spline interface of the first stator clip may be disposed within the first recess. The first lug may be disposed within each lug recess of each flange of the first flange pair. The second lug may be disposed within each lug recess of each flange of the second flange pair. The first stator clip may be configured to be riveted to the stator disk at the first flange pair and the second flange pair.

In various embodiments, the inner perimeter may further comprise a second recess. In various embodiments, the inner perimeter may comprise a third lug and fourth lug proximate the second recess. The third lug and fourth lug may be disposed on either side of the second recess. In various embodiments, the inner perimeter may further comprise a second stator clip disposed within the second recess.

BRIEF DESCRIPTION OF THE DRAWINGS

The accompanying drawings are included to provide a further understanding of the present disclosure and are

DETAILED DESCRIPTION

The detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods may find particular use in connection with stator disc clips for aircraft brake systems. However, various aspects of the disclosed embodiments may be adapted for optimized performance with a variety of components, including bushings and rotor clips, and in a variety of systems. Accordingly, numerous applications of the present disclosure may be realized.

As used herein, a first component that is "radially outward" of a second component means that the first component is positioned at a greater distance away from a common axis (e.g., a rotational axis of a wheel assembly) than the second component. A first component that is "radially inward" of a second component means that the first component is positioned closer to the common axis than the second component. In the case of components that rotate about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
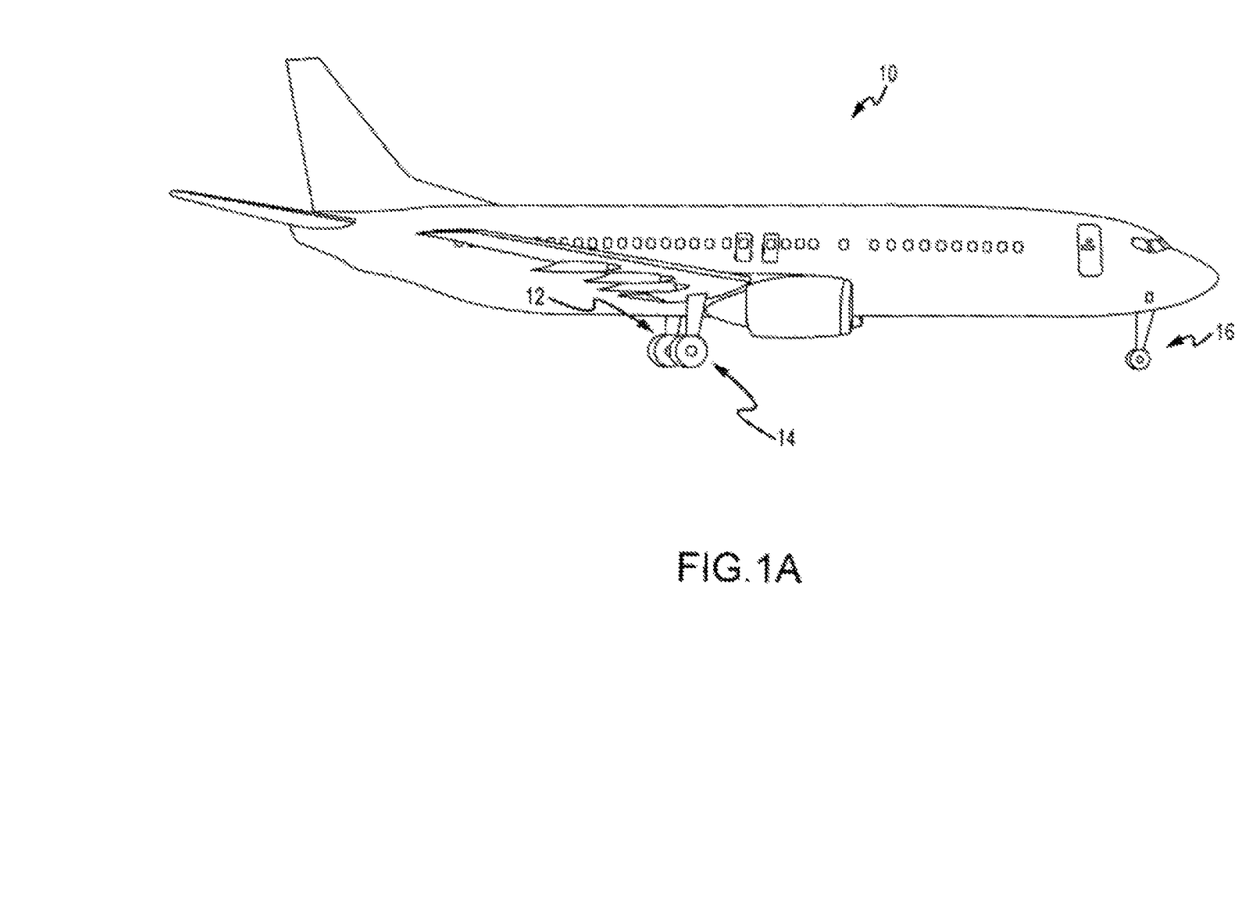
FIG. 1A illustrates an exemplary aircraft having a brake assembly in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
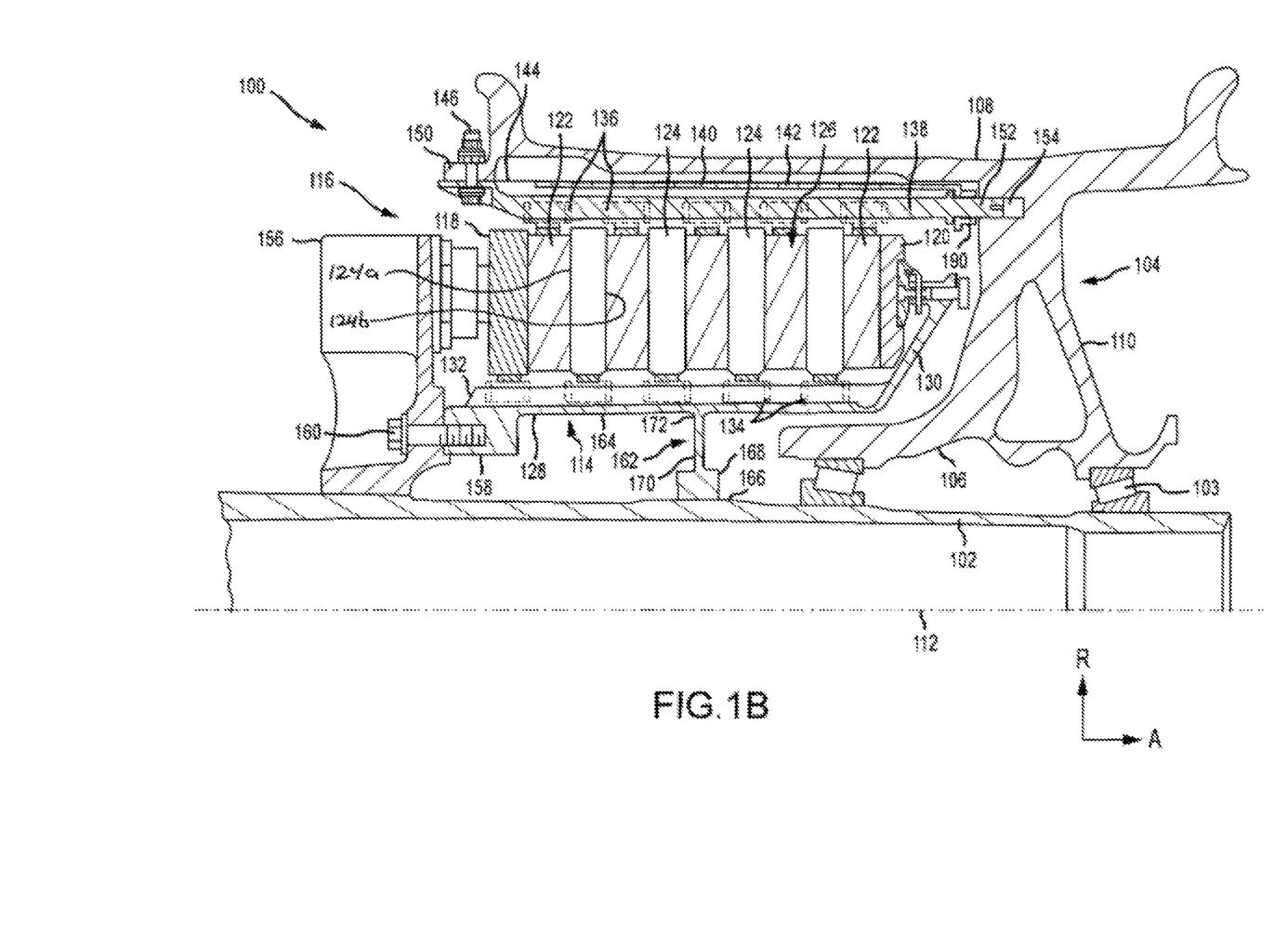
FIG. 1B illustrates a cross-sectional view of a brake assembly in accordance with various embodiments.

Referring to FIG. 1B, there is schematically depicted a brake assembly or a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102. Each stator disk 124 includes a pair of oppositely disposed sides 124a, 124b that each interface with a corresponding rotor disk 122 during a braking operation.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as, for example, carbon, carbon composites, and the like, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2A:
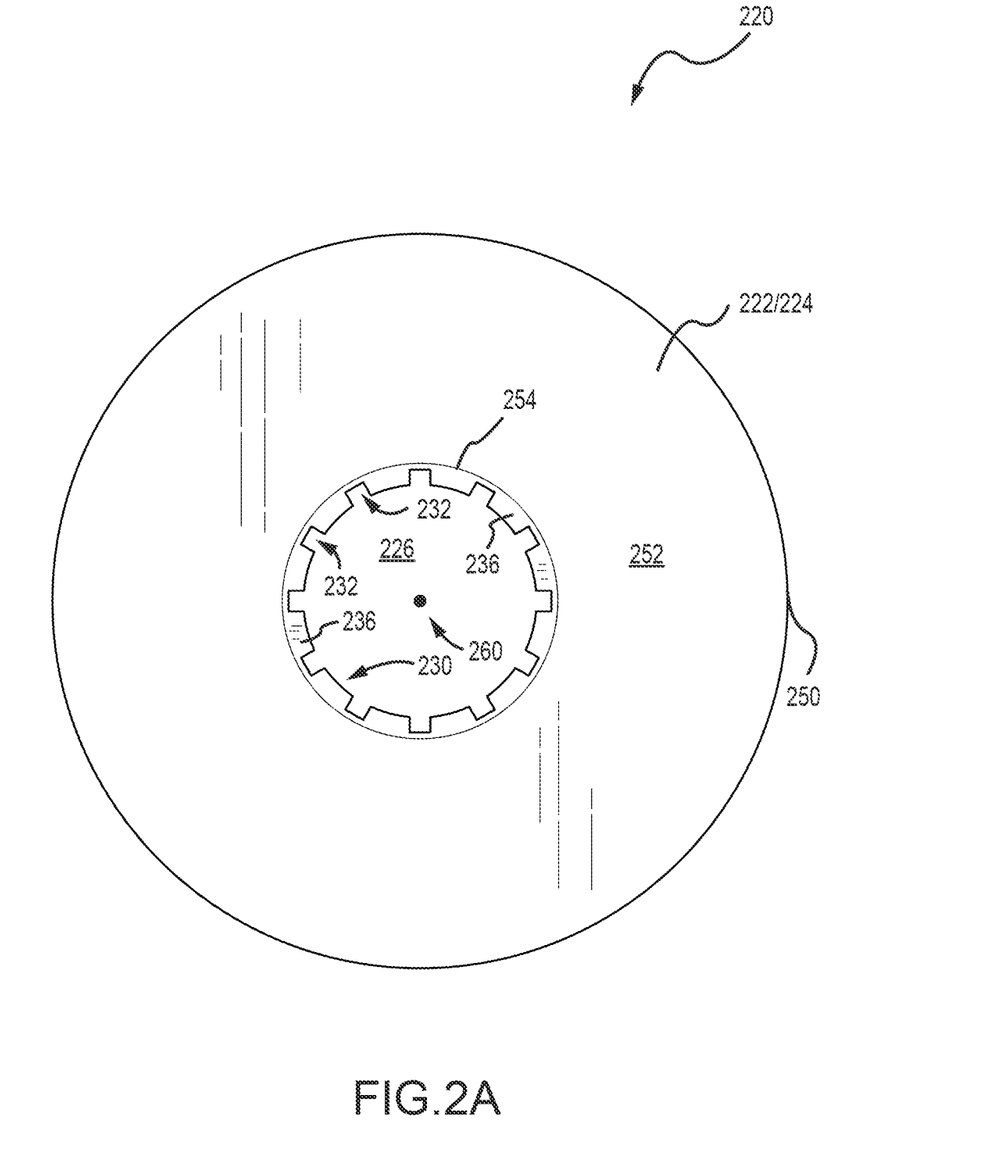
FIG. 2A illustrates a plan view of a stator disk for a brake assembly in accordance with various embodiments.

FIG. 2A illustrates a stator disk 220 that may be used as the stator disks 124 addressed above with regard to the brake assembly 100 of FIG. 1B. Although the stator disk 220 may be formed from any appropriate material or combination of materials, the stator disk 220 may be formed from carbon in various embodiments. An inner perimeter 230 of the stator disk 220 (or more generally for an inner perimeter 230 of a stator disk assembly that utilizes the stator disk 220) is illustrated in FIG. 2A, is annularly disposed about a first reference axis 260 (e.g., extends a full 360° about the axis 260), and defines an outer boundary of a first aperture or a first mounting aperture 226 (e.g., for receipt of a torque plate). A plurality of lugs 236 are incorporated by the inner perimeter 230, and these lugs 236 may be characterized as being disposed in radially-spaced or circumferentially-spaced relation to one another about/relative to the first reference axis 260. A recess 232 is disposed between each adjacent pair of lugs 236. As such, the stator disk 220 also includes a plurality of recesses 232 and these recesses 232 may be characterized as being disposed in radially-spaced or circumferentially-spaced relation to one another about/relative the first reference axis 260. These lugs 236 and recesses 232 will be addressed in more detail below in relation to FIG. 2B and FIGS. 3A-3B. The stator disk 220 may include any appropriate number of lugs 236 and recesses 232.

An outer perimeter 250 of the stator disk 220 is disposed outwardly of the inner perimeter 230, relative to the first reference axis 260. The stator disk 220 includes a first side 222 (e.g., corresponding with the first side 124a of one of the stator disks 124 shown in FIG. 1B), where this first side 222 may interface with a rotor disk during a braking operation. The stator disk 220 includes an oppositely disposed second side 224 (e.g., corresponding with the second side 124b of one of the stator disks 124 shown in FIG. 1B), where this second side 224 may interface with a different rotor disk during a braking operation. The thickness of the stator disk 220 corresponds with the spacing between these two sides 222, 224. Each of the first side 222 and second side 224 of the stator disk 220 include what may be characterized as a braking surface 252 that extends from an inner braking surface boundary 254 to the outer perimeter 250 of the stator disk 220. Each braking surface 252 would engage a different corresponding rotor disk (e.g., rotor disk 122—FIG. 1B) during a braking operation.

Figure 2B:
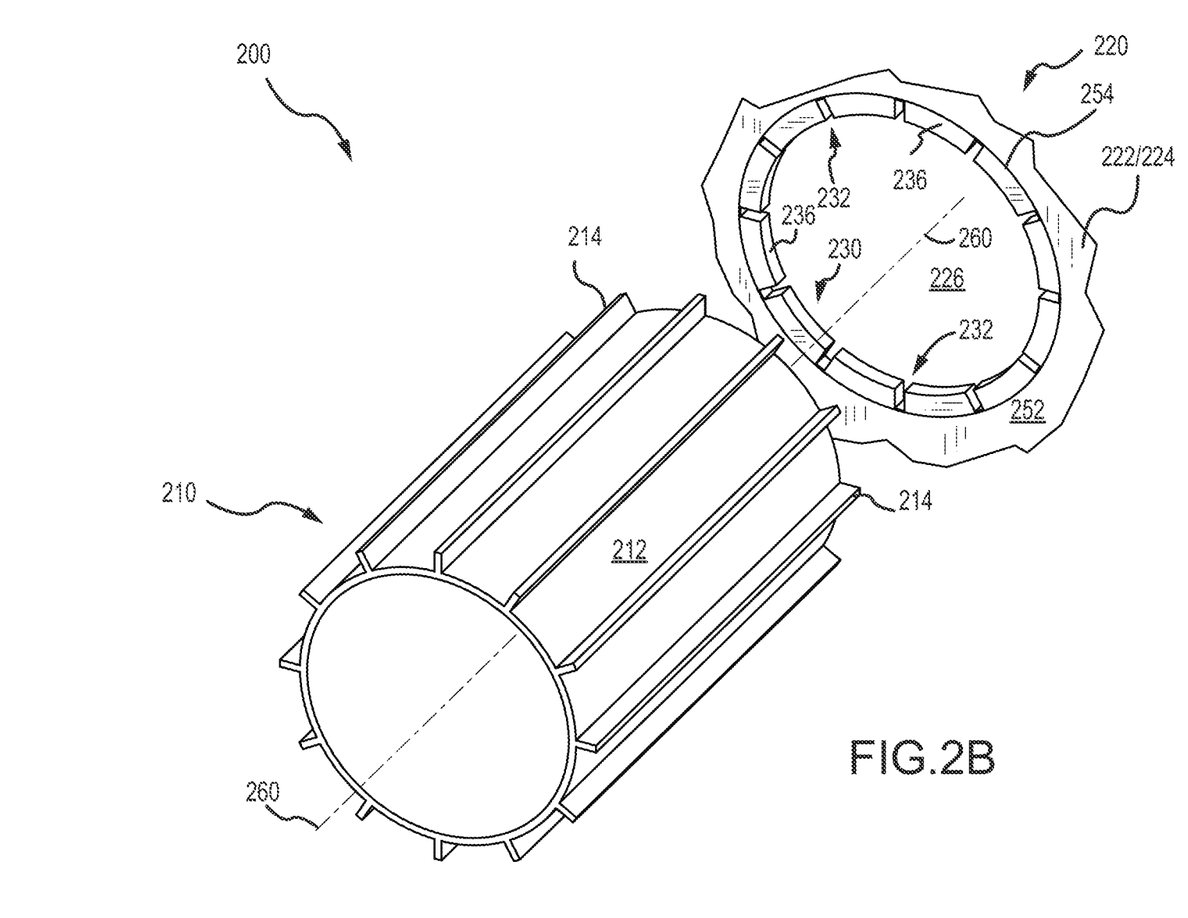
FIG. 2B is an exploded, perspective illustrating a torque plate barrel and a stator disk for a brake assembly, in accordance with various embodiments.

FIG. 2B illustrates a portion of a brake assembly 200 (e.g., brake assembly 100 of FIG. 1B) that includes the above-described stator disk 220. Only an inward portion of the stator disk 220 (relative to the first reference axis 260) is illustrated in FIG. 2B. The brake assembly 200 further includes a torque plate barrel or a torque plate 210. The torque plate barrel 210 includes an outer surface 212 that is disposed about the first reference axis 260. This outer surface 212 may be cylindrical. A plurality of splines, ribs, or protrusions 214 are disposed on the outer surface 212 of the torque plate barrel 210. The splines 214 may be disposed parallel with the first reference axis 260 and may be disposed about this same first reference axis 260 (e.g., the splines 214 may be characterized as being disposed in radially-spaced or circumferentially-spaced relation to one another about/relative the first reference axis 260). Each spline 214 of the torque plate barrel 210 is disposed in a corresponding recess 232 of the stator disk 220. Accordingly, typically, the brake assembly will include an equal number of splines 214 (torque plate barrel 210) and recesses 232 (stator disk 220).

In various embodiments, the stator disk 220 may be part of a stator disk assembly, which may comprise stator clips disposed within the recesses 232 of the stator disk 220.

Figure 3A:
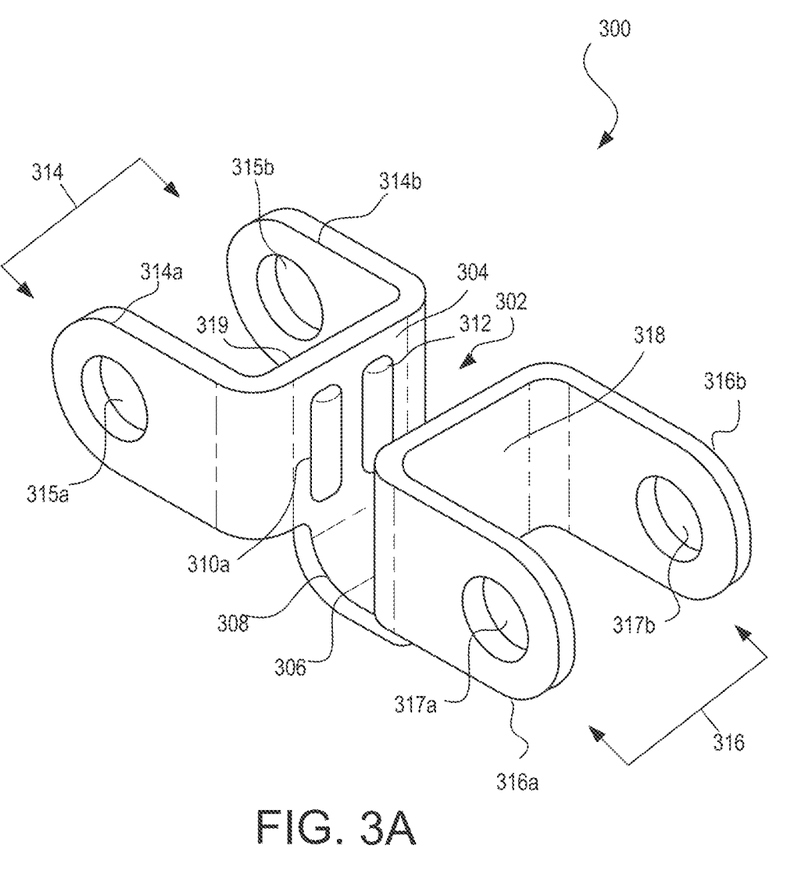
FIG. 3A illustrates a perspective view of a stator clip, in accordance with various embodiments.
Figure 3B:
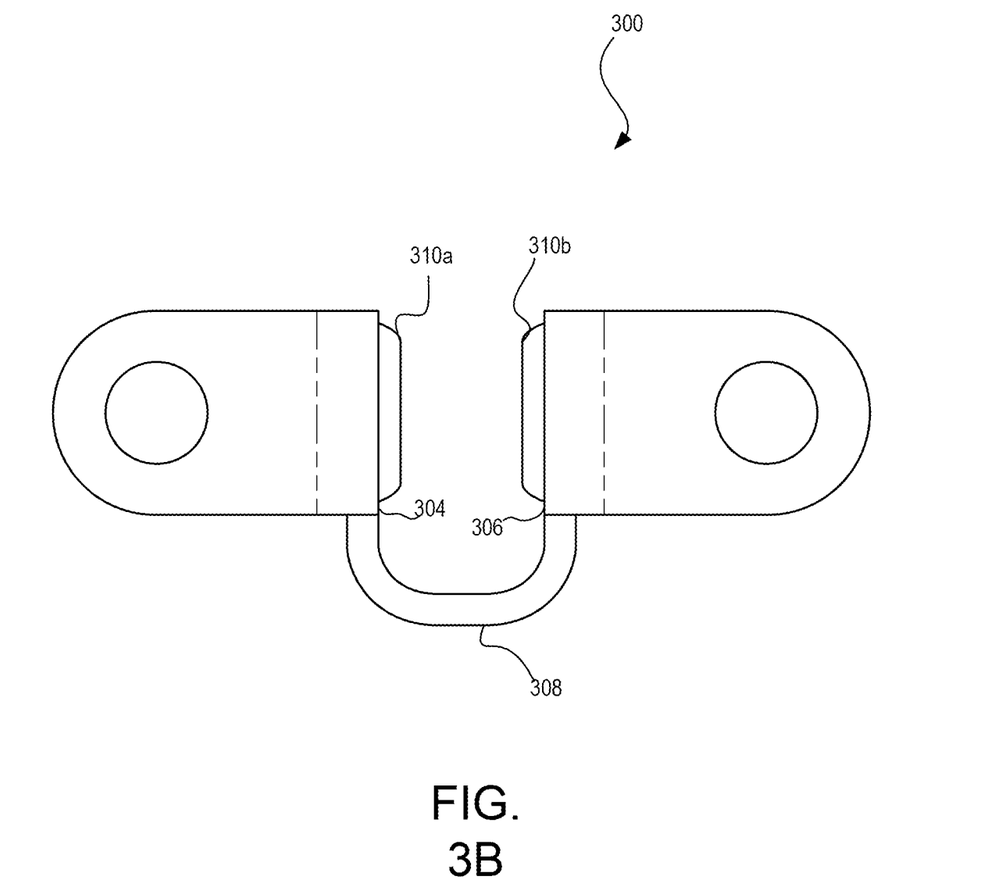
FIG. 3B illustrates a perspective view of a stator clip, in accordance with various embodiments.

FIGS. 3A and 3B illustrate a stator clip 300 according to the present disclosure. Stator clips 300 may improve lug strength and the structural integrity of the stator disk. The stator clip 300 may comprise a spline interface 302. The spline interface 302 may include a first face 304 and a second face 306 opposite the first face 304. In various embodiments, the spline interface 302 may comprise a third face 308 bridging between the first face 304 and the second face 306. The third face 308 may be substantially orthogonal to the first face 304 and the second face 306. In various embodiments, the spline interface 302 may be U-shaped. In various embodiments, the spline interface 302 may be a monolithic structure.

With additional reference to FIG. 2B, and with further reference to FIGS. 3A and 3B, in various embodiments, the spline interface 302 of the stator clip 300 may be disposed in a corresponding recess 232 of the stator disk 220. Accordingly, each spline 214 of the torque plate barrel 210 may be disposed in the spline interface 302. In various embodiments, the first face 304 and the second face 306 of the spline interface 302 may each comprise a ridge (e.g., raised pad). In various embodiments, and as shown in FIG. 3B, the spline interface 302 may comprise at least two ridges 310a/310b. Two ridges may be advantageous to provide increased loading stability, such that rotation is not dependent on a single ridge. The ridges 310a/310b may reduce the contact area between the torque plate barrel spline 214 and the stator clip 300, while maintaining the overall integrity of the stator clip 300. This may be advantageous since the greater the contact area between the spline and the stator clip, the greater the drag force. Moreover, having the ridges 310a/310b along the first 304 and also having ridges 310a/310b along the second face 306 would orient the ridges perpendicular to the drag force (e.g., the direction of the drag), which may further reduce drag.

In various embodiments, the ridges 310a/310b may be hemi-cylindrical, extending longitudinally across the first face 304 and second face 306. Hemi-cylindrical ridges may be well suited to accommodate high torque, especially during high energy braking operations such as aircraft landing. However, the ridges 310a/310b may be of any desired shape suitable for accommodating torque load. In various embodiments, the ridges 310a/310b may be sized to accommodate the highest peak torque that may be generated by the brake assembly without damaging the brake assembly. In various embodiments, and as further shown in FIGS. 3A and 3B, the ridges 310a/310b may comprise rounded ends 312 or may be rounded to prevent edge loading that may contribute to dynamic instability. Accordingly, the ridges 310a/310b may reduce the likelihood of degraded braking performance or dynamic instability associated with edge loading.

In various embodiments, the stator clip 300 may comprise a first flange pair 314. The first flange pair 314 may be substantially orthogonal to a reverse side wall 319 of the first face 304. The first flange pair 314 may comprise opposing flanges 314a/314b. Each flange 314a/314b may define a lug recess 315a/315b. The stator clip 300 may further comprise a second flange pair 316. The second flange pair 316 may be substantially orthogonal to a reverse side wall 318 of the second face 306. The second flange pair 316 may comprise opposing flanges 316a/316b. Each flange 316a/316b may define a lug recess 317a/317b. The stator clip 300 may be riveted to a stator disk (e.g., FIG. 2B, 220) at the lug recesses 315a/315b/317a/317b of the flange pairs 314/316. Stator disk lugs (FIG. 2A, 236) may be disposed within the lug recesses 315a/315b/317a/317b, securing the stator clip 300 to the stator disk (FIG. 2B, 220). The flange pairs 314/316 may be substantially U-shaped, enabling the flanges to slide onto a stator disk.

Figure 4:
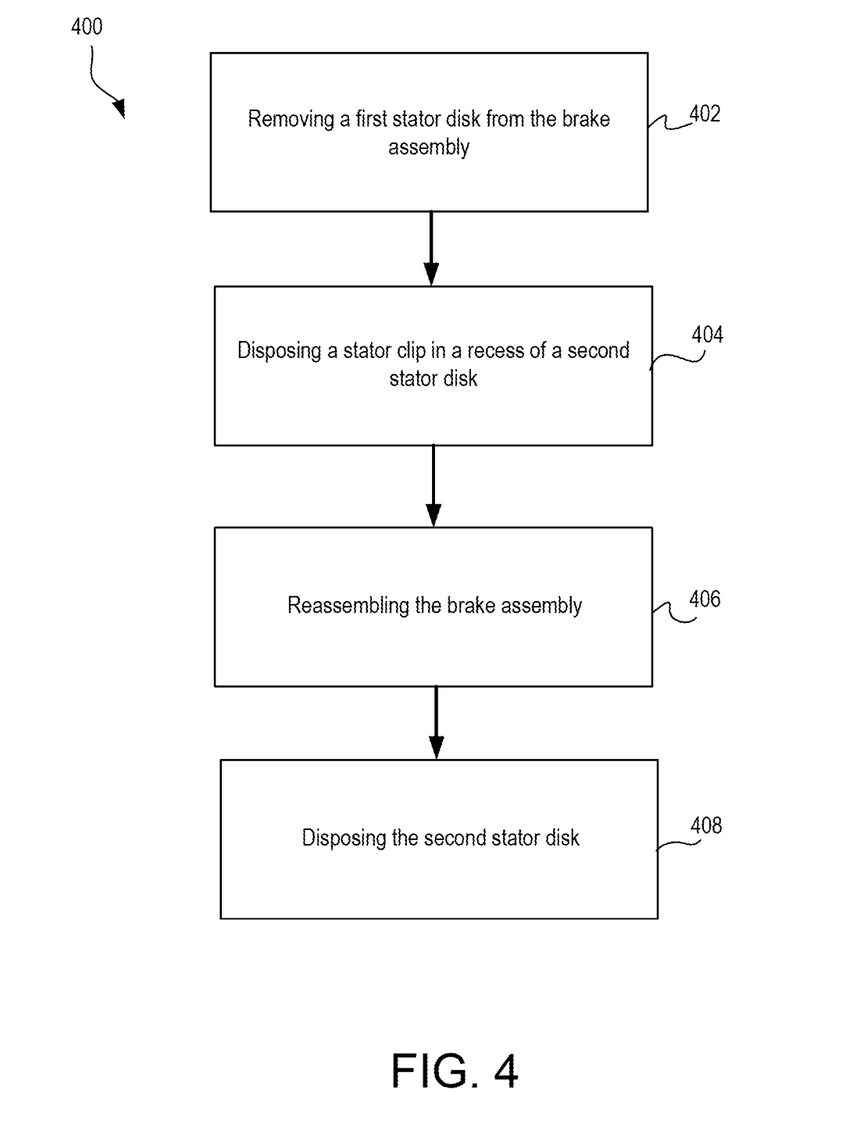
FIG. 4 illustrates a method for rearranging a brake assembly in accordance with various embodiments.

A method 400 of rearranging a brake assembly is illustrated in FIG. 4. The method 400 may comprise removing (step 402) a first stator disk from the brake assembly. The method 400 may further comprise disposing (step 404) a stator clip in a recess of a second stator disk. In various embodiments, a plurality of stator clips may be disposed in any number of recesses of the second stator disk. The method 400 may comprise reassembling (step 406) the brake assembly by disposing (step 408) the second stator disk on a torque plate barrel. In various embodiments, the second stator disk may be disposed between an adjacent pair of rotor disks.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator clip, comprising:
   a spline interface, comprising:
      a first face;
      a second face, wherein the first face is opposite the second face, wherein the first face and the second face each comprises a ridge; and
      a third face bridging between the first face and the second face, wherein the third face is orthogonal to the first face and the second face;
   a first flange pair, the first flange pair being orthogonal to a reverse side wall of the first face, the first flange pair comprising opposing flanges, each flange defining a lug recess; and
   a second flange pair, the second flange pair being orthogonal to a reverse side wall of the second face, the second flange pair comprising opposing flanges, each flange defining a lug recess.

2. The stator clip of claim 1, wherein the spline interface is U-shaped.

3. The stator clip of claim 1, wherein the spline interface is monolithic.

4. The stator clip of claim 1, wherein the stator clip is configured to be riveted to a stator disk.

5. The stator clip of claim 1, wherein the first face and the second face each comprise at least two ridges.

6. The stator clip of claim 5, wherein the at least two ridges are hemi-cylindrical.

7. The stator clip of claim 6, wherein the wherein the at least two ridges each comprise rounded ends.

8. A brake assembly, comprising:
   a torque plate barrel comprising an outer surface disposed around a first reference axis, wherein the outer surface comprises a first spline proceeding about the first reference axis; and
   a stator disk assembly mounted on the torque plate barrel, comprising:
      a stator disk comprising an inner perimeter disposed about a first aperture, wherein the inner perimeter comprises a first recess, wherein the inner perimeter comprises a first lug and second lug proximate the first recess, wherein the first lug and the second lug are disposed on either side of the first recess, wherein the torque plate barrel extends into the first aperture of the stator disk; and
      a first stator clip disposed within the first recess, wherein:
         the first spline is disposed within a spline interface of the first stator clip, and
         the spline interface comprises:
            a first face;
            a second face, wherein the first face is opposite the second face, wherein the first face and the second face each comprises a ridge, and
            a third face bridging between the first face and the second face, wherein the third face is orthogonal to the first face and the second face.

9. The brake assembly of claim 8, wherein the torque plate barrel further comprises a second spline, wherein the second spline and the first spline are spaced from one another proceeding about the first reference axis.

10. The brake assembly of claim 9, wherein the inner perimeter further comprises a second recess, wherein the inner perimeter comprises a third lug and fourth lug proximate the second recess, wherein the third lug and fourth lug are disposed on either side of the second recess.

11. The brake assembly of claim 10, further comprising a second stator clip disposed within the second recess.

12. The brake assembly of claim 11, wherein the second spline is disposed within a spline interface of the second stator clip.

13. The brake assembly of claim 12, wherein the first stator clip is riveted to the first lug and the second lug of the inner perimeter.

14. The brake assembly of claim 13, wherein the second stator clip is riveted to the third lug and fourth lug of the inner perimeter.

15. A stator disk assembly, comprising:
   a stator disk comprising an inner perimeter disposed about a first aperture, wherein the inner perimeter comprises:
      a first recess; and
      a first lug and second lug proximate the first recess, wherein the first lug and the second lug are disposed on either side of the first recess; and
      a first stator clip disposed within the first recess, wherein the first stator clip comprises:
         a spline interface, wherein the spline interface comprises:
            a first face, a second face, wherein the first face is opposite the second face, wherein the first face and the second face each comprises a ridge, and
            a third face bridging between the first face and the second face, wherein the third face is orthogonal to the first face and the second face;
         a first flange pair; and
         a second flange pair.

16. The stator disk assembly of claim 15, wherein the first flange pair is orthogonal to a reverse side wall of the first face, the first flange pair comprising opposing flanges, each flange defining a lug recess, wherein the second flange pair is orthogonal to a reverse side wall of the second face, the second flange pair comprising opposing flanges, each flange defining a lug recess.

17. The stator disk assembly of claim 16, wherein the spline interface of the first stator clip is disposed within the first recess, wherein the first lug is disposed within each lug recess of each flange of the first flange pair, wherein the second lug is disposed within each lug recess of each flange of the second flange pair, wherein the first stator clip is configured to be riveted to the stator disk at the first flange pair and the second flange pair.

18. The stator disk assembly of claim 15, wherein the inner perimeter further comprises:
   a second recess; and
   a third lug and fourth lug proximate the second recess, wherein the third lug and fourth lug are disposed on either side of the second recess; and
   a second stator clip disposed within the second recess.

* * * * *